United States Patent [19]

Smith

[11] Patent Number: 4,495,606

[45] Date of Patent: Jan. 22, 1985

[54] METHOD AND APPARATUS FOR COMBINED CEMENT BOND AND ACOUSTIC WELL LOGGING

[75] Inventor: John R. E. Smith, Houston, Tex.

[73] Assignee: Dresser Industries, Inc., Dallas, Tex.

[21] Appl. No.: 297,812

[22] Filed: Aug. 31, 1981

[51] Int. Cl.³ .............................................. G01V 1/40
[52] U.S. Cl. ...................................... 367/86; 367/26; 367/28; 181/105
[58] Field of Search ....................... 181/103, 105, 106; 340/856, 858, 861; 367/27, 28, 33, 35, 81, 86

[56] References Cited

U.S. PATENT DOCUMENTS

| | | | |
|---|---|---|---|
| 3,182,286 | 5/1965 | Zimmerman et al. | 340/856 |
| 3,195,105 | 7/1965 | Brokaw | 340/857 |
| 3,257,639 | 6/1966 | Kokesh | 367/27 |
| 3,292,146 | 12/1966 | Dewan | 367/35 |
| 3,456,754 | 7/1969 | Zemanek | 340/856 |
| 3,618,001 | 11/1971 | Zill et al. | 340/858 |
| 3,691,518 | 4/1970 | Schuster | 367/28 |
| 4,346,460 | 8/1982 | Schuster | 367/28 |

Primary Examiner—Maynard R. Wilbur
Assistant Examiner—K. R. Kaiser
Attorney, Agent, or Firm—Patrick H. McCollum; Richard M. Byron

[57] ABSTRACT

Method and apparatus are provided for measuring acoustic signals having amplitudes of widely varying magnitude during one traversal of the borehole corresponding to indications of cement bonding along a casing as well as acoustic travel time through an increment of the formation. Variable attenuators are provided associated with acoustic receivers disposed within the logging sonde wherein attenuation may be automatically adjusted as a function of acoustic transmitter-receiver trigger pulses transmitted downhole, depending upon whether a cement bond or other log of acoustic signal information having a substantially different magnitude is desired.

10 Claims, 10 Drawing Figures

U.S. Patent   Jan. 22, 1985   Sheet 1 of 4   4,495,606
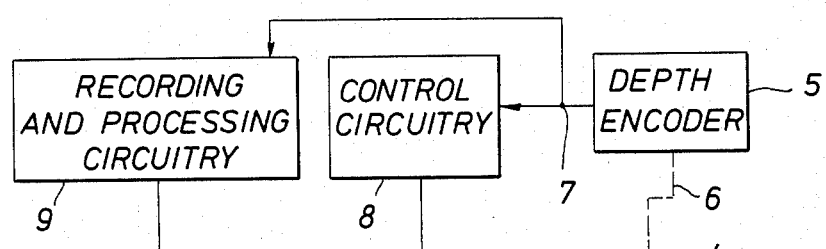
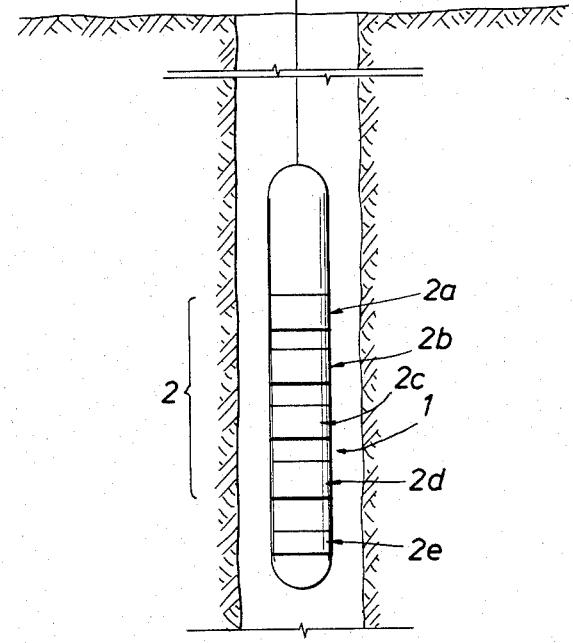
FIG.1
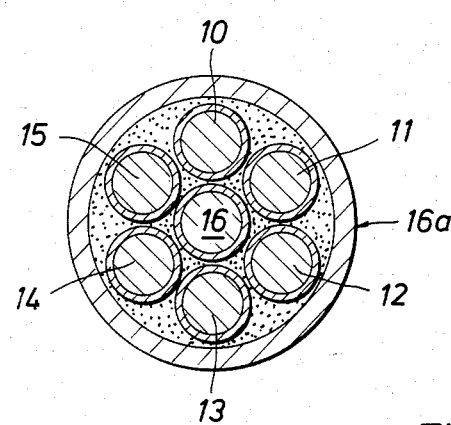
FIG. 2

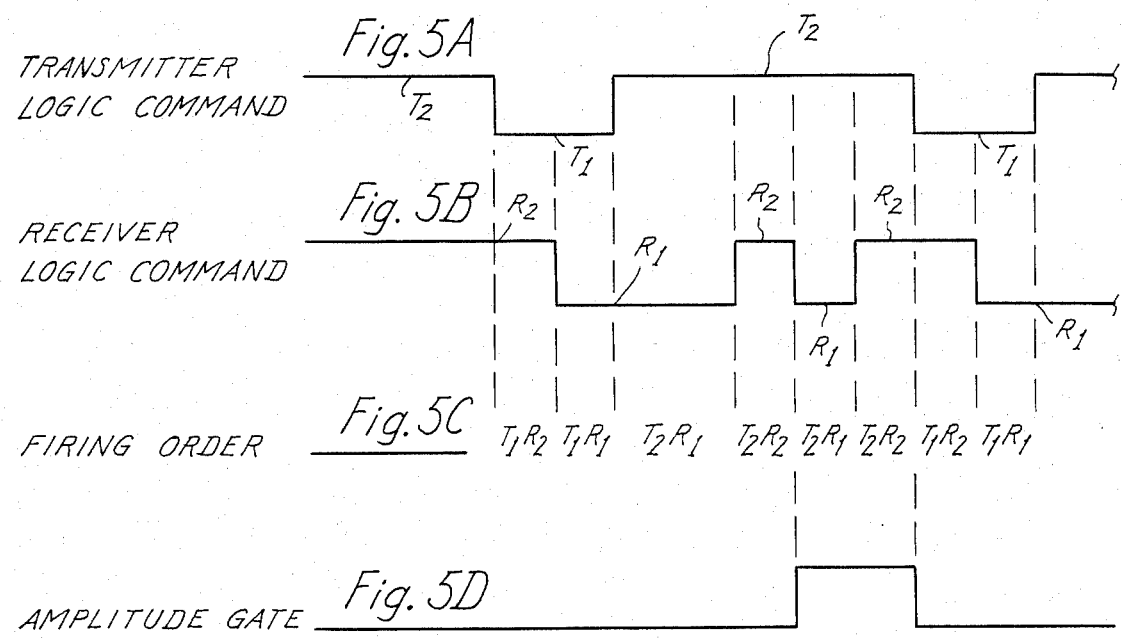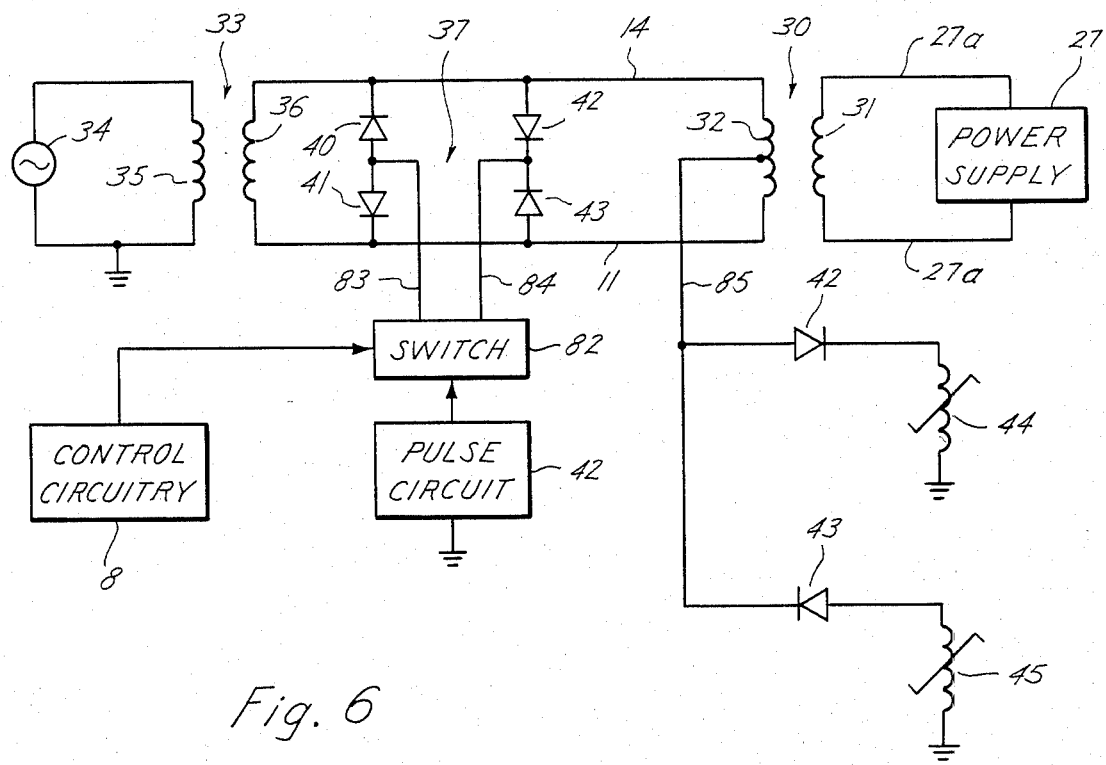

METHOD AND APPARATUS FOR COMBINED CEMENT BOND AND ACOUSTIC WELL LOGGING

BACKGROUND OF THE INVENTION

This invention relates to methods and apparatus for well logging, and more particularly relates to improved methods and apparatus for transmitting command and measurement signals to and from a logging sonde.

It is well known that oil and gas are found in subsurface earth formations, and that wells are drilled into these formations to recover such substances. What is not generally known is that, for various reasons, the contents of most such formations do not spontaneously discharge into the well bore upon being penetrated. Furthermore, it is usually necessary to survey or "log" substantially the entire length of the borehole to locate those formations of interest before a well can be completed to produce oil or gas.

There is no single well logging technique or device which can provide a direct indication of oil or gas in a particular formation of interest. Instead, it is common practice to measure the lithology of the earth substances adjacent to the borehole, whereby those formations of potential interest may be identified. Since no one lithological parameter or characteristic, or even any single combination of such parameters, can of itself provide a definitive and conclusive indication of the presence of oil and gas in commercial quantities, there has been a continuing need to make as many different logging measurements as possible.

The expense involved in logging an oil or gas well is quite high, however, and is usually dependent on the time required to traverse the borehole with the sonde or logging tool. Also, well logging measurements made during one passage of the sonde may not directly correlate to measurements made during another passage of the sonde because corresponding increments of such measurements will not necessarily have been taken at the same borehole depth. For these and other reasons there has been an increasing need to provide methods and apparatus for making a plurality of different but correlated measurements during the same passage of the sonde through the borehole.

One such plurality of measurements relates to the traversal time of acoustic energy across an increment of the formation, which may provide indications of formation porosity and the like, as well as a measurement of the relative amplitudes of such energy along the borehole. The latter measurement is frequently made, for example, during a logging operation known in the art as a cement-bond log.

In a typical well completion operation, a well casing is placed within the borehole and cement is pumped into the annulus for purposes of isolating production zones, preventing migration of undesirable fluids, and the like. It is frequently desirable to obtain measurement of the degree and quality of the bonding of the cement to the casing as an indication of this sealing effect, as it is found that at times the cement may not entirely fill the annulus at certain increments along the borehole, or that a channelling effect may occur.

In other instances, it may be desirable to know the extent of packing of the earth formation itself about a drill pipe which, for example, may be stuck in the borehole. Often the point of compaction may behave in a manner similiar to the aforementioned cement-bonded pipe in severely attenuating an acoustic signal, such that the same amplitude measurement may be employed in both the cement bonding and stuck pipe or formation packing situations.

One problem associated with employment of conventional logging tools for purposes of making the aforementioned acoustic travel time measurements or seeking to recover the entire acoustic signature traversing a portion of the formation on the one hand, and attempting to measure the amplitudes of such acoustic signals for the cement bond log or related purposes just described, relates to the relative magnitude of the signals involved in both situations. It will be readily apparent that, due to the aformentioned severe attenuation of acoustic signals along the casing in instances of formation packing and cement bonding, substantial signal amplification may be required. However, in instances when the acoustic signature traversing the formation is sought to be recovered, if the same signal amplification is employed, it will be readily apparent that the signal amplification means may be driven into saturation severely distorting the resulting measured acoustic signature. On the other hand, because the signal amplitude provides information as to the quality of cementation, decreasing as the quality increases to a very greatly attenuated extent, it will be appreciated that if the appropriate amplifier gains or attenuation are adjusted so as to be compatible with acoustic travel time or acoustic signature measurements in which the signature traverses the formation, there may not be sufficient amplification to recapture the amplitude information of the greatly decreased signal in the case of the cement bond log for example.

From the foregoing, it will be readily apparent that it was highly desirable to provide means for selectively adjusting the amplitude of the measured acoustic signature dependent upon the particular type of logging operation being conducted. Thus, one solution in the prior art was to provide such an adjustable acoustic signal attenuation or amplification means, whereby the attenuator was set to one preselected gain and an entire logging operation was conducted for cement bond log purposes, for example, and the logging tool was then adjusted to a second preselected gain or attenuation for purposes of conducting the conventional log of acoustic energy traversing the formation. It should be obvious, however, that this attempted solution suffered from the drawback of requiring two entirely separate traversals of the sonde through the borehole, which, as previously pointed out, was a serious drawback.

In recognition of this problem, the prior art thereafter provided means for selectively adjusting the amplification or attenuation from the surface while the logging sonde was disposed in the borehole. However, this solution employed the use of separate logging cable conductors for controlling amplitudes on the one hand, and still other conductors for purposes of determining the firing order of the various transmitters and receivers in the acoustic logging tool. Also, as previously noted, this attempted solution had serious drawbacks due to the required committment of additional logging conductors already in short supply for performing both of these functions. Moreover, no means was provided for automatically cycling the gain or attenuation between the two preselected levels during the logging operation such that, even if it was possible to obtain an acoustic log during one borehole traversal at the two preselected gains, the logging operation was thus so inefficient as to be commerically impractical.

These and other disadvantages are overcome by the present invention, however, wherein improved methods and apparatus are provided for deriving a plurality of different logging measurements with a reduced interference between the various command and logging signals during the same trip through the borehole.

SUMMARY OF THE INVENTION

In a preferred embodiment of the present invention, a well logging system is provided which includes a sonde of generally conventional design and a multi-conductor logging cable for supporting the sonde at selected locations at the borehole. In addition, suitable electronic circuitry may be included at the well site for processing and recording measurement signals derived by the sonde and transmitted through the logging cable, and other circuitry for generating appropriate command and power signals for transmission through the cable to the sonde.

In the sonde, a pair of acoustic energy transmitters and receivers are provided respectively for introducing acoustic energy into the surrounding formation or along increments of the borehole and for receiving said energy after transmission. Each of said receivers is interconnected to its respective amplifier.

Both amplifiers may be interconnected with an appropriate first attenuator device selectively controllable by a command signal from the surface whereby a preselected amount of attenuation may be introduced.

The receiver outputs may further be preferably connected to a second attenuator device having, in like manner, a preselectable attenuation controllable as desired from the surface from a second command signal.

Outputs from either said first or second attenuator devices may be selected in a manner to be described. The attenuation of the first attenuator is adjusted from the surface so as to maintain the amplified measurement signal within a first predetermined range of acoustic energy signals such as those associated with conventional acoustic logging operations known in the art so as to prevent saturation of subsequent amplifiers while still providing sufficient amplification of such signals for desired resolution and measurement thereof.

The second attenuator is adjusted from the surface so as to provide outputs having the same approximate magnitude as those provided by the above-described output of the first attenuator when acoustic energy signals substantially larger than those hereinabove noted are encountered by the receivers. Thus, it will be seen that in order to maintain the same relative magnitude of output of the first and second attenuators, it may be expected that said adjustment of the second attenuator will be such that it will provide substantially more attenuation than the first attenuator upon adjustment.

One illustration of the types of acoustic energy signals which may be substantially larger than those described with respect to the first attenuator are, for example, when acoustic energy emitted by the transmitting transducers is not substantially attenuated by traversal into the formation or cement surrounding the borehole before being received, but rather takes a more direct and unattenuated path from receiver to transmitter through channels along the casing where cement has failed to bond to the casing, resulting in a "cement bond" log known in the art.

A selector means is further provided preferably for automatically selecting, in response to a further control signal from the surface comprised of acoustic trigger logic pulses, whether the output of the first or second attenuator is desired during the logging operation, depending upon the magnitude of the acoustic energy being received or expected. For example, the first attenuator output may be desired for a portion of a logging operation in which acoustic signals of relatively small magnitude are being received from the formation, in which case amplification therefor may be desirable. Similarly, the second attenuator output may, in like manner, be selected when larger signals are being obtained as in the case of the aforementioned conventional cement bond logging operation. It is thus contemplated by the subject invention to make both such measurements in alternating fashion during the same traversal of the borehole.

Appropriate gating means is further provided for controlling the selector means and thus the logging signal output amplitude. More particularily, circuitry is provided for decoding acoustic logic command pulses from the surface for controlling the order in which each of the aforementioned transmitters or receivers is to be enabled, as well as the selection of the first or second attenuator outputs.

In addition to thus controlling a conventional four transmitter acoustic logging firing sequence known in the art (such as $T_1R_2$, $T_1R_1$, $T_2R_1$, $T_2R_2$) and selecting the first attenuator output during such sequence, the gating means is provided with means for both triggering two additional firings (such as $T_2R_1$, $T_2R_2$ or $T_1R_1$, $T_1R_2$) and selecting the second attenuator output during this second sequence, thus providing during one traversal of the borehole, both a conventional acoustic log firing sequence and amplitude, and a cement bond log firing sequence and amplitude. By varying the command pulses, either sequence may be selected alone or conjunctively.

Accordingly, it is a feature of the present invention to provide an improved multipurpose acoustic logging tool suitable for measuring acoustic logging signals of widely varying magnitude.

It is another feature of the present invention to improve the dynamic range handling capability of acoustic logging instruments.

It is a further object of this invention to provide method and apparatus for automatically controlling the amplitude of acoustic logging signals during a logging operation.

It is yet another feature of the present invention to control attenuation of acoustic logging measurement signals between at least two discrete levels during a logging operation.

Still another feature of the subject invention is to provide means for adjusting at least one of said two discrete attenuation levels during the logging operation.

It is also a further specific feature of this invention to provide for conventional and cement bond acoustic logging during one traversal of the borehole.

It is another objective of this invention to provide means for preventing saturation of amplifiers for amplifying acoustic logging measurements due to wide variations in acoustic signature measurements.

It is another specific feature of the present invention to selectively control attenuation of acoustic logging signals by the same command pulses delivered from the surface to the sonde for purposes of controlling the firing order of acoustic transmitters and receivers disposed within said sonde.

These and other features and advantages of the present invention will become apparent from the following detailed description, wherein reference is made to the Figures in the accompanying drawings.

IN THE DRAWINGS

FIG. 1 is a simplified functional overall representation of a well logging system embodying one form of the present invention.

FIG. 2 is a pictorial representation, in cross section, of the logging cable depicted generally in FIG. 1.

Figure 3:
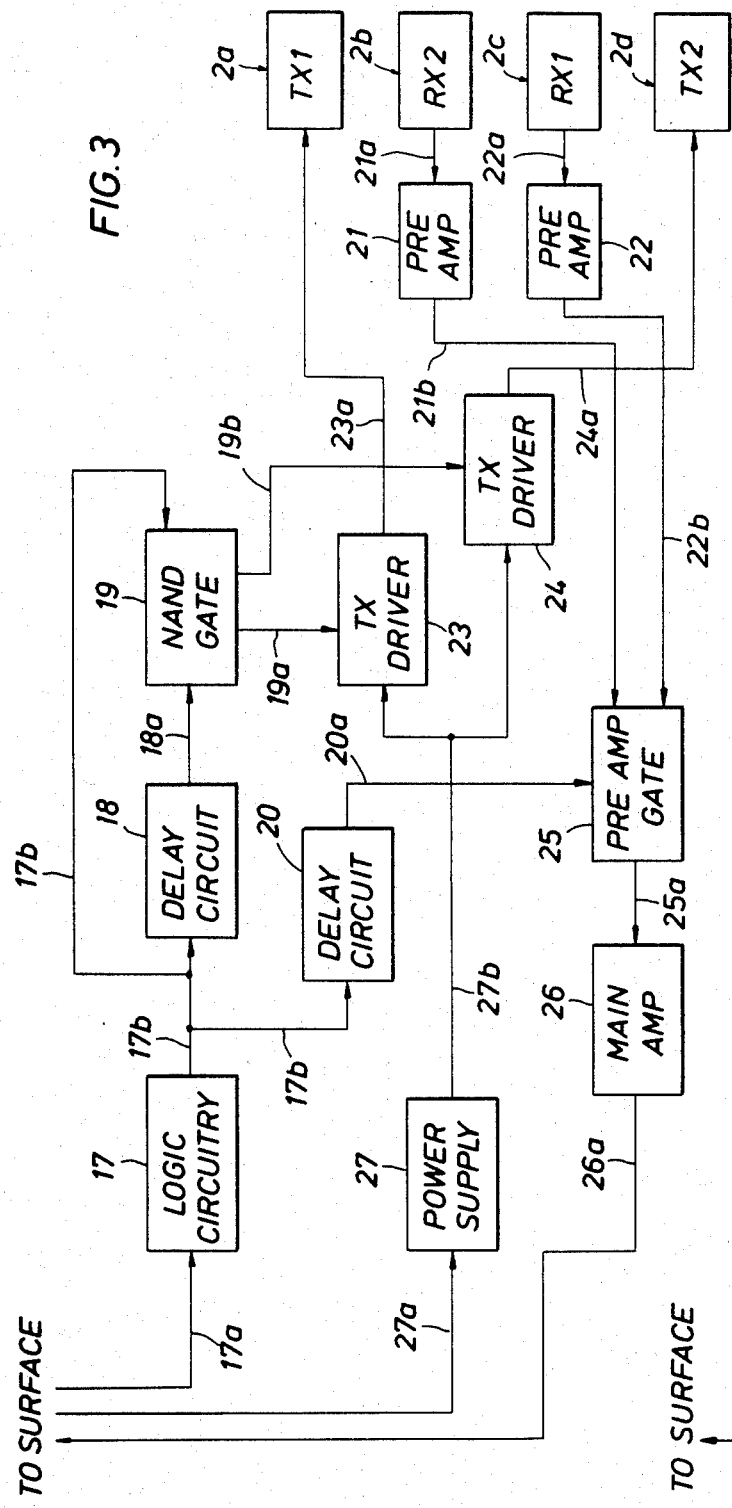
FIG. 3 is a functional representation of a portion of the system depicted in FIG. 1.

FIGS. 5A–D depict the timing of the operation of the portion of the system shown in FIG. 3.

FIG. 6 is a more detailed representation of the circuitry of the system shown in FIG. 1.

Figure 7:
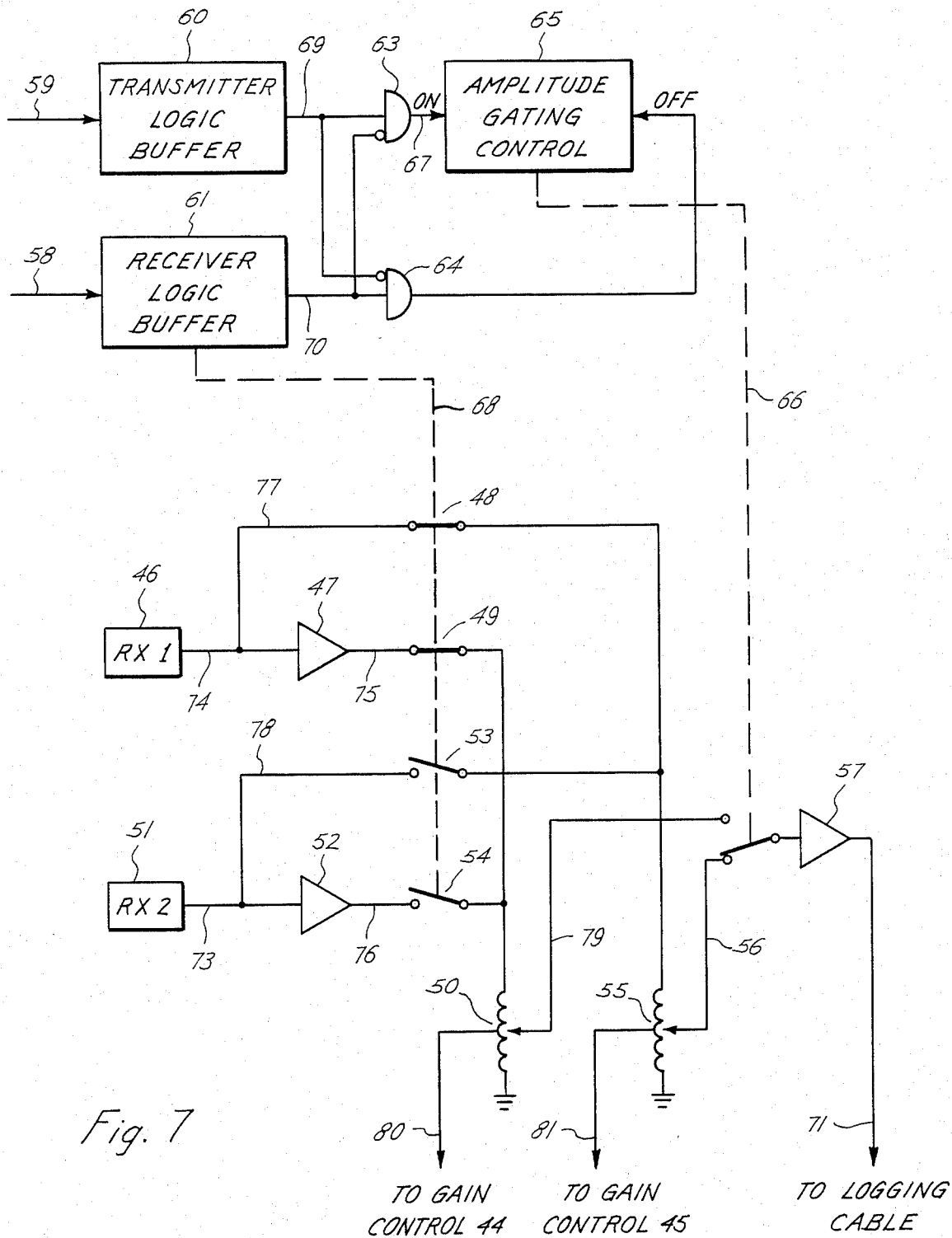

FIG. 7 is another more detailed representation of the circuitry of the system shown in FIG. 1.

DETAILED DESCRIPTION

Referring now to FIG. 1, there may be seen a simplified functional representation of an embodiment of the present invention wherein there is more particularly shown a logging tool or sonde 1. The sonde 1 may preferably include an acoustic logging module 2 including transmitters 2a and 2d and receivers 2b and 2c for generating an electrical measurement signal indicative of a selected plurality of lithological characteristics of the surrounding earth materials. In addition, the sonde will preferably include at least one other measurement module or sensor 2e as will hereinafter be explained in greater detail.

Referring again to FIG. 1, it will be seen that signals from the logging sonde 1 may be conveniently transferred to the surface by means of a multi-conductor logging cable 3 from which the sonde 1 is suspended in the borehole. More particularly, the cable 3 may suitably be disposed over a sheave wheel 4 or the like which rotates as the sonde 1 is lowered or raised in the borehole, and which is appropriately coupled to a suitable depth encoder circuitry 5 by a drive shaft 6 or the like. Accordingly, rotation of the drive shaft 6 by the sheave wheel 4 will cause the depth encoder circuitry 5 to generate an appropriate depth indication signal 7 which, in turn, causes control circuitry 8 to generate an electrical command signal which is transmitted through the cable 3 to the sonde 1 in the borehole. In addition, the indication signal 7 is also delivered to the recording and processing circuitry 9, to coordinate the recording of logging signals with a correlative indication of the depth at which such signals were initiated.

In a preferred embodiment of this invention, the acoustic logging module 2 in the sonde 1 will be activated at preselected depths in the borehole by the command signals generated by control circuitry 8 in response to the depth indication signal from depth encoder circuitry 5. In response to the command signal from control circuitry 8, the acoustic logging module 2 may sequentially energize transmitters 2a and 2d which will then deliver bursts of acoustic energy into the surrounding earth materials. At a preselected time interval after energizing each transmitter, the acoustic logging module will selectively enable receivers 2b and 2c to sense the arrival of each such energy burst in the earth materials in response to said command signals. Receivers 2b and 2c may preferably be adapted to generate electrical measurement signals indicative of the acoustic energy passing through the selected increment of the surrounding earth materials and incident upon said receivers. These measurements may therefore be conveniently transferred to recording and processing circuitry 9 by means of the logging cable 3.

Referring now to FIG. 3, there may be seen a more detailed representation of the acoustic logging module 2 in the sonde 1, including appropriate logic circuitry 17 for receiving the command signal 17a generated by the control circuitry 8 depicted in FIG. 1. It is within the scope of the present invention to provide means for delivering noise inducing pulsed information, either downhole to the sonde or uphole to the surface on the logging cable, which may be utilized for numerous purposes, while simultaneously delivering noise-sensitive measurement signals of various types from the sonde to the surface on the same cable.

One such use for the pulsed information is for purposes of controlling the firing order of various acoustical transmitters and receivers of an acoustic logging tool disposed within the sonde, so as to generate an acoustic signature as one such measurement signal. Accordingly, although such logging tools are known in the art, one embodiment thereof will be herein described in detail for purposes of completeness, as representative of both one application of the pulsed information thus transmitted downhole, and as further representative of the hereinbefore noted types of generators of noise-sensitive measurements such as the acoustic signature thus generated.

It should be apparent that yet another type of such pulsed data (other than the aforementioned acoustic trigger logic pulses) may well be some other form of pulsed data such as pulse-code modulation telemetry data for example or "pcm" data transmitted uphole in a manner known in the art. In like manner, it will be apparent while it is thus within the scope of the present invention to simultaneously transmit such data uphole while transmitting the aforementioned noise-sensitive acoustic signature uphole, in the alternative it may be desirable to transmit other such noise-sensitive data such as radiation pulses, or alternating current measurements of the remote earth potential as employed in the dual laterolog logging instruments known in the art uphole while simultaneously transmitting the "pcm" data, acoustic pulses noises, or other noise-inducing pulsed data.

Referring again to FIG. 3, the logic circuitry 17 is connected to deliver a logic pulse 17b to a delay circuit 18, another delay circuit 20, and to a NAND gate 19. The delay circuit 18 may, after an appropriate predetermined time interval, deliver a suitable delay pulse 18a to NAND gate 19, and the delay circuit 20 may, after another suitable time interval longer than that provided for by delay circuit 18, generate a suitable delay pulse 20a to actuate or enable preamplifier gate 25.

In response to concurrent receipt of both logic pulse 17b and delay pulse 18a, the NAND gate 19 will preferably generate either trigger pulse 19a which passes to transmitter driver 23, or trigger pulse 19b which passes to transmitter driver 24. The arrival of trigger pulse 19a will cause transmitter driver 23 to energize transmitter 2a to generate an appropriate burst of acoustic energy which passes into the adjacent earth materials surrounding the borehole as hereinbefore explained. Alternatively, trigger pulse 19b will cause transmitter driver 24 to energize transmitter 2d to generate a similar acoustic pulse for a similar purpose.

Receivers 2b and 2c may be suitably adapted to generate, in response to the arrival of these bursts of acoustic energy through the surrounding earth materials, acoustic signals 21a and 22a which are preferably amplified by preamplifiers 21 and 22 to produce signals 21b and 22b passing to preamplifier gate 25. In response to an appropriate sequence of delay pulses 20a generated by delay circuit 20 as hereinbefore explained, preamplifier gate 25 will appropriately transmit either preamplified signal 21b or 22b to main amplifier 26 as gate signal 25a, and main amplifier 26 will suitably amplify such signal in a conventional manner for transmission to the surface as signal 26a on logging cable 3.

It will be noted that transmitter drivers 23 and 24, are preferably supplied with electrical power 27b by power supply 27 which, in turn, receives power from the surface over conductor 27a of logging cable 3. In addition, the other components previously described with respect to FIG. 3 may also be energized in this manner by conductors and circuitry not depicted herein.

It will further be noted that upon each firing of transmitter 2A and 2D, NAND gate 19 generating the firing pulses may a deliver such pulses to appropriate circuitry in pre-amplifier gate 25 such as a one-shot generator (not shown) so as to cause a marker pulse for each such transmitter firing to be generated and transmitted to the surface at the time of firing. Such marker pulses may thus provide a reference point from which to time arrival of the received acoustic energy, for purposes of calculating acoustic travel time in a manner known in the art.

Figure 4:
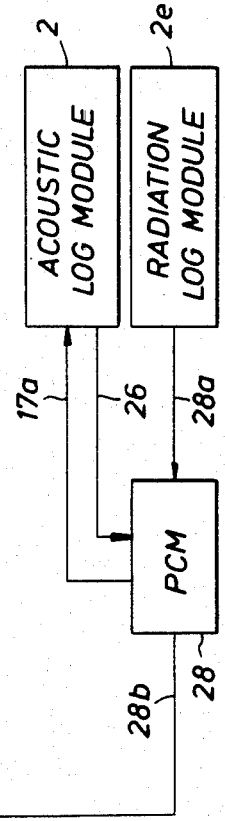
FIG. 4 is another different functional representation of a portion of the system depicted in FIG. 1.

Referring now to FIG. 4, there may be seen a simplified functional representation of an additional portion of the internal components of the sonde 1 which is depicted in FIG. 1, and more particularly depicting a simplified representation of the acoustic log module 2, together with both the command signal 17a and the output signal 26a, which has previously been discussed with respect to FIG. 3. In addition, there may be seen a similar functional representation of the radiation log module 2e, which is depicted in FIG. 1, together with an output signal 28a which, in turn, is preferably delivered to a suitable pulse code modulation circuit 28 having its output signal 28b arranged to be conducted to the surface by way of the logging cable 3.

In the system which is depicted in FIGS. 1-3, it is particularly desirable to transmit the output signal 28b from the pulse code modulation circuit 28 to the surface by way of the same balanced pair of conductors which have been selected to carry the command signal to the pcm 28. The reason is that the frame of digital data which composes the output signal 28b is formed of pulsed data in like manner to the aforementioned pulsed command signals, both of said signals having high frequency components due to their pulsed nature capable of inducing noise through coupling into adjacent conductors. Accordingly, in conductor cable utilizations of the prior art, the output signal 28b is prone to create interference with respect to sensitive, noise-susceptible measurement signals in the center conductor 16 of the cable depicted in FIG. 2, as is the command signal.

It should also be apparent that if the output signal 28b is transmitted through this balanced pair of conductors at the same time that the command signal is sought to be transmitted downhole, signal 28b may tend to interfere with and distort such command signals. The command signal is, of course, generated on a depth-dependent basis, and is the trigger for taking not only the measurements being derived by the acoustic log module 2, but also other measurements not hereinbefore discussed in particular detail. Accordingly, it is desirable for the timing and transmission of the command signal travelling downhole to occur at a different time from that of the signals 28b travelling uphole. For this reason, the pulse code modulation circuit 28 preferably includes provision (not shown) for monitoring the output signal 26 from the acoustic log module 2, and awaiting the fourth of each group of such acoustic signatures before transmitting an appropriate frame of data in the form of output signal 28b to be thereafter followed by a next set of four acoustic trigger logic pulse trains and corresponding acoustic signatures. In that manner, signal 28b will only be generated and transmitted by the pulse code modulation circuit 28 uphole after the occurrence of each sequence of pulse trains composing or constituting the command signal travelling downhole on the conductor pair of 28b.

Referring again to FIG. 1, it may be noted that the logging sensor module 2e may also be suitable for developing a spontaneous potential or other resistivity-type of measurement of the characteristics of the subsurface earth formation materials or for developing pulses whose occurence and amplitudes correspond to incidence and energy levels of natural gamma rays upon the sonde, respectively, and that the output measurement from such a sensor may conveniently be transmitted to the surface by way of the central electrode 16 in the well logging cable 3. It will be noted, as hereinbefore stated, that the frame of digital data constituting measurement signal 28b frequently interferes with such measurements as will the higher voltage pulsed command signal 17a. Thus, transmission of output signal 28b over the same diametrically opposed balanced pair of conductors which carries the command signal 17a in accordance with the subject invention will avoid such interference and distortion of these sensitive, noise-susceptible measurement signals from sensor 2e carried on center conductor 16.

Referring now to FIG. 2, there is depicted a simplified cross-sectional representation of the logging cable 3, wherein there may be seen eight separate conductors. More particularly, conductor 16 is located substantially along the longitudinal axis of the cable 3, and conductors 10, 11, 12, 13, 14 and 15 are evenly spaced about conductor 16 within the cable, spiraling about conductor 16 in helical fashion. In addition, cable 3 may also be provided with an exterior metal sheath to provide an electrical ground for the system depicted in FIG. 1.

Referring again to FIG. 3, it is preferable that command signal 17a comprise a first square wave voltage pulse of negative polarity, a second succeeding square wave voltage pulse of positive polarity, a third later square wave voltage pulse of positive polarity, and a fourth and final square wave voltage pulse of negative polarity. The logic circuitry 17 may be suitably adapted to discriminate between each such command signal 17a and all other electrical signals which may also be present on the same cable conductor, and to generate a logic pulse sequence 17b only in response to said command signals 17a.

Referring more particularly now to FIG. 3, there will be seen logic circuitry 17 for receiving and decoding these command signals 17a. The purpose of logic circuitry 17 is to detect receipt of such a command signal 17a and to discriminate such a command from any other pulse train which may appear as signal 17a, thus indicating upon receipt of such a signal, that a conventional firing sequence of four transmitter-receiver pairs, known in the prior art, is required. The further purpose of logic circuitry 17 is to generate the proper logic commands causing the rest of the circuitry to generate such a sequence of firing and receipt. For example, by convention, logic circuitry 17 may generate transmitter firing commands upon receipt of command signal 17a, starting with two transmitter 2a ($T_1$) firings and alternating to two transmitter 2d ($T_2$) firings in the order $T_1$, $T_1$, $T_2$, $T_2$, until four such firings have occurred.

In like manner, the logic circuitry 17 may be further designed to generate receiver enabling pulses whereby polarity of the pulse in the command signal 17a determines which receiver is enabled. Thus, the logic circuitry 17 may be designed so as to initially enable receiver 2c ($R_2$), followed by receiver 2b ($R_1$) during the first positive pulse of command signal 17a, followed by enabling again of receiver $R_1$ (in that the third pulse of command signal 17a is also positive in like manner to the second pulse), followed finally by the enabling of receiver $R_2$ again as the fourth pulse of command signal 17a is once again negative.

Referring still to FIG. 3, there will be seen a delay circuit 18 and a NAND gate 19, the latter of which is actually comprised of two NAND gates conventionally known in the art as a dual NAND gate. When a particular transmitter pulse, such as $T_1$, is generated by the logic circuitry 17 as part of the pulse sequence 17b, this transmitter pulse is simultaneously delivered to the delay circuit 18 and to its respective NAND gate 19 over line 17b. It will thus be seen that the delay circuit 18 and NAND gate 19 are arranged in a conventional fashion known in the prior art so as to generate a pulse output, either 19a or 19b, which occurs at a fixed time interval (determined by delay circuit 18) after occurrence of the particular transmitter pulse in the pulse sequence 17b. In this manner, no transmitter is caused to fire until a time interval after receipt of the pulse on command signal 17a corresponding to this transmitter command. The purpose of this time delay is to ensure that all transients caused by arrival of the pulse on command signal 17a have expired prior to firing the transmitter.

Thus, it will be seen that a transmitter firing pulse 19a will be delivered to the transmitter driver 23 of transmitter 2a a fixed time interval after the first, negative going pulse of the command signal 17a is received by the logic circuitry 17. In like manner, a transmitter firing pulse 19b will be delivered to the transmitter driver 24 causing the transmitter 2d to fire a preselected time interval after receipt of the third, positive going pulse of the command signal 17a received by the logic circuitry 17.

Still referring to FIG. 3, as previously described, there will be provided a delay circuit 20, the purpose of which is similar to that of delay circuit 18, namely, to prevent receipt of acoustic signatures by the preamp gate 25 until transients caused by the pulse on command signal 17a corresponding to the particular receiver have expired. As previously described, the logic circuitry 17 may be designed so as to enable a particular receiver as a function of the polarity of the pulses in the command signal 17a. Thus, in the present example, because the first such pulse is negative, followed by two positive pulses and a negative pulse, receivers may be enabled for each transmitter firing in the order $R_2$ $R_1$, $R_1$, $R_2$ so as to effect the hereinbefore described transmitter-receiver sequence $T_1R_2$, $T_1R_1$, $T_2R_1$, $T_2R_2$.

In FIG. 3, there may be seen a preamp/gate 25, the purpose of which is to prevent passage of received signals 21b and 22b to the main amplifier 26 for amplification until the appropriate time period has passed for expiration of transients. The gating preamp/gate 25 may be a conventional flip-flop responsive to the control signal 20a from the delay circuit 20. In response to the first pulse of the command signal 17a, the logic circuitry 17 will thus generate a pulse of the sequence 17b, which, after appropriate delay in the delay circuit 20, will cause the preamp/gate 25, in response to signal 20a, to pass the acoustic signature received on receiver 2d to the main amplifier 26 for amplification.

In like manner, upon receipt of the second pulse of the command signal 17a, which is now of positive polarity, the logic circuitry 17 may generate an appropriate signal 17b, which after delay through circuit 20, will cause the preamp/gate 25 to toggle, passing the acoustic signal 22b received by receiver 2c to the main amplifier 26. As the third pulse of the command signal 17a is also positive, during the next transmitter firing receiver 2c will continue to be enabled, after suitable delay by the delay circuit 20, so as to pass the acoustic signature received thereby to the main amplifier 26. Finally, because the fourth pulse in the command signal 17a has returned negative, this will cause the logic circuitry 17 to generate an appropriate command pulse of the sequence 17b which, again after appropriate delay in the delay circuit 20, will cause the preamp/gate 25 to toggle back to its initialized position whereby the fourth acoustic signature, received by receiver 2b, will be passed to the main amplifier 26 for amplification.

In the prior art systems for controlling the acoustic logging module 2, separate command signals for transmitters and receivers are employed. The transsmitter command signal is transmitted downhole using one of the logging cable's internal conductors and the grounded metal sheath. The receiver command signal is sent downhole using another of the logging cable's internal conductors and the grounded metal sheath. Because transmitter and receiver trigger or control signals are typically high voltage pulses relative to measurement and other data, they induce unacceptable levels of noise into other internal conductors of the logging cable. Thus in the prior art systems, low voltage or noise-susceptible measurement signals could not be transmitted to the surface while command signals were being transmitted to the logging sonde.

In prior art methods of well logging, signals generated by pulse code modulation ("PCM") circuitry are transmitted to the surface using one of the internal conductors of the logging cable and the grounded metal sheath. Since signals generated by pulse code modulation circuits are typically composed of a series of voltage pulses, transmission of the pulse code modulation signals also induce unacceptable levels of noise into other internal conductors of the logging cable. Thus, in prior art systems, sensitive measurement signals could not be transmitted to the surface while pulse code modulation signals were being transmitted to the surface.

In still other systems, attempts were made to send such pulsed information as control or PCM signals downhole or uphole, respectively, over conductor pairs such as 13-14, or 13-11 of FIG. 2, wherein one conductor of the pair was a return path for the signal carried on the other conductor of the pair, and carried a voltage of equal and opposite polarity thereto referenced to armor 16a.

While such techniques met with some limited success in reducing noise induced in sensitive measurements carried on conductor 16, such problems still occurred. However, with the conductor utilization of the present invention, wherein the conductors of said conductor pair are substantially diametrically opposed, such as conductors 13-10, or 12-15 of FIG. 2, it has been found that yet additional reduction in center conductor noise has been achieved which was heretofore unappreciated.

Referring now to FIG. 3, it may be seen that a preferred embodiment of the present invention requires only one command signal, command signal 17a, to control the selective and sequential activation of transmitters and receivers of acoustic logging module 2. In a preferred embodiment of the present invention, command signal 17a is transmitted to acoustic logging module 2 on a pair of internal conductors of logging cable 3. Transmission of command signal 17a on a pair of internal conductors of logging cable 3, greatly minimizes the electrical noise which transmission of command signal induces into other internal conductors of logging cable 3. It may be seen that transmission of the command signal on pairs of internal conductors of logging cable 3 severely limited the practicality of prior art acoustic logging modules. This is because the prior art acoustic logging modules required separate transmitter command signals and separate receiver command signals. Transmitting each of said transmitter and receiver command signals on a separate pair of internal conductors of logging cable 3 would require the use of four internal conductors of logging cable 3. Because of the limited number of internal conductors available for carrying information bearing signals to the surface, it is not practical to dedicate four of the internal conductors to transmission of command signals.

In a preferred embodiment of the present invention, command signal 17a is transmitted to logic circuitry 17 on diametrically opposed conductors such as conductors 11 and 14 of logging cable 3. In response to the hereinbefore described command signal 17a, acoustic logging module 2 will generate, as hereinbefore described, four sequential main amplifier.

output signals 26a which may conveniently be transmitted to recording and processing circuitry 9 on conductor 16 of logging cable 3. Pulse code modulator circuitry 28 may be suitably adapted to generate pulse code modulator signal 28b in response to the fourth of said sequential main amplifier output signals 26a. Pulse code modulator signal 28b may be conveniently transmitted to recording and processing circuitry 9 on the same conductors 11 and 14 of logging cable 3. In a preferred embodiment of the present invention, the duration of pulse code modulator signal 28b is such that transmission of said signal to the surface is complete before the next series of acoustic logging module command signals 17a is generated.

Because of the reduction in mutual coupling between conductor pairs such as 11-14 on the one hand and center conductor 16 achieved by transmitting command signal 17a and pulse code modulation signals 28b on diametrically opposed conductors 11 and 14 of logging cable 3 (or other such high voltage pulsed signals relative to those noise susceptible lower voltage signals on conductor 16), said low voltage sensitive analog or pulsed measurements such as the hereinbefore noted gamma ray pulses, acoustic signatures, or remote earth potentials may be transmitted to recording and processing circuitry 9 on center conductor 16 of logging cable 3 concurrently with the transmission of command signal 17a and pulse code modulator signal 28b and other such signals. It may be seen that such concurrent transmission of these signals eliminates the necessity for time-sharing. As a result, these sensors may operate substantially continuously, eliminating those unlogged portions of the borehole which result from time-sharing operation and other aforementioned problems caused by transmission of these noise-inducing pulses.

Referring to FIGS. 5A through 5D, there will be seen another example of a particular arrangement of command pulses 17a particularly suitable for controlling both the firing or enabling sequence of the various acoustic transmitters and receivers as well as the amplitude of the received acoustic energy in accordance with the present invention.

It is conventional in the prior art to provide a series of acoustic transmitter pulses to logic circuitry 17 wherein presence of the pulse signifies that activation of one transmitter such as $T_2$ is desired and wherein absence of a pulse indicates that the enabling or firing of yet another transmitter such as $T_1$ is desired. In like manner, it is conventional to provide a similar series of pulses to logic circuitry 17 for controlling the enabling of one or more acoustic receiver circuits, whereby presence of such a pulse indicates, for example, that a receiver $R_2$ should be activated and absence of such a pulse indicates that yet another receiver such as $R_1$ should be activated. By providing such a series of two pulse trains, one for transmitter activation and one for receiver activation, wherein the two pulse trains are maintained approximately 180 degrees out of phase, it will be seen that a firing order comprised of all four possible combinations of one transmitter and receiver from a selection of two transmitters and two receivers may be achieved so as to obtain a "borehole compensated" acoustic measurement well known in the prior art.

For example, with particular reference to FIGS. 5A through 5C, it will be seen that in FIG. 5A a transmitter logic command may be provided wherein the presence of a high state enables $T_2$ and a low state enables $T_1$. In like manner, with respect to FIG. 5B a receiver logic command may be provided wherein a high state enables receiver $R_2$ and a low state enables receiver $R_1$. Thus, by a comparison of FIG. 5A and 5B the resulting firing order of FIG. 5C may be obtained.

However, one particular feature of the present invention may be noted with respect to FIG. 5C which is different from the aforementioned practice in the prior art of providing transmitter and receiver pulses which are 180 degrees out of phase. It will be seen that a conventional firing sequence has been obtained from the logic commands of FIGS. 5A and 5B, specifically $T_1R_2$, $T_1R_1$, $T_2R_1$, and $T_2R_2$. However, it will be noted that prior to repeating the sequence (only the first two firings of the repeated sequence being shown in FIG. 5C as $T_1R_2$, $T_1R_1$) an additional firing of $T_2R_1$ and $T_2R_2$ are caused by the fact that the transmitter logic commands and receiver logic commands are not simply the same pulse train being 180 degrees out of phase from each other. Thus, while the aforementioned four transmitter firing sequence $T_1R_2$, $T_1R_1$, $T_2R_1$, $T_2R_2$ may be used for purposes of obtaining a borehole compensated conventional acoustic log, it will be readily apparent that the additional transmitter firing sequence $T_2R_1$ and $T_2R_2$ may be utilized with a different acoustic measurement signal gain associated therewith for purposes of obtaining an additional log of a different acoustic phenomenon of interest. One such measurement, for example, may be a cement bonding in an alternating fashion with the conventional acoustic log whereby at a particular borehole depth a four transmitter firing borehole compensated conventional acoustic log is first performed followed by in the previously noted example, a cement bond log at a different amplitude in accordance with the present invention.

Referring to FIG. 5D there will be seen a representation of a suitable amplitude gate control signal for decreasing the acoustic signal measurement amplitude associated with receivers $R_1$ and $R_2$ during the firing of the second $T_2R_1$ and $T_2R_2$ sequence for cement bond logging purposes or other such applications wherein measurement signal amplitudes substantially higher than those associated with the preceding four transmitter firing sequence may be expected. It will be apparent that some means must be provided for detecting when the second occurrence of the $T_2R_1$, $T_2R_2$ firing sequence has occurred and for distinguishing it over the first occurrence of such $T_2R_1$, $T_2R_2$ firing sequence in order to provide the aforementioned amplitude adjustment for the second logging function such as the cement bond log. One such means for achieving this result in accordance with the teachings of the present invention is to provide a suitable transmitter and receiver logic command decoding circuit operating in accordance with the following logic or "truth" table:

| RECEIVER LOGIC COMMAND STATUS | TRANSMITTER LOGIC COMMAND STATUS | AMPLITUDE GATE STATUS |
| --- | --- | --- |
| Transition to low status | High | Turn on amplitude gate |
| Transition to high status | High | No Change |
| High | Transition to low status | Turn off amplitude gate |

By comparing the above truth table to FIGS. 5A–5D, it will be seen that by monitoring the *transition* of the respective transmitter and receiver logic commands a means may be provided for discriminating between the first and second occurrence of the firing sequence $T_2R_1$, $T_2R_2$ so as to selectively vary the measurement signal attenuation during the second firing of $T_2R_1$, $T_2R_2$. The amplitude gate signal of FIG. 5D will be hereinafter described in more detail, but for present purposes it may be noted that such a signal may be delivered to a suitable pre-amp gate 25 such as that previously described in FIG. 3 for adjusting the magnitude of the received acoustic signal prior to further amplification.

In accordance with the present invention it would be desirable to not only adjust the relative magnitudes between the attenuation or gain provided for the first four transmitter firing sequence and the subsequent two transmitter firing sequence, but also to independently adjust the absolute amplification or attenuation of measurements from each such first and second sequence through a range. Thus, referring to FIG. 6, there will be seen a means for providing such independent attenuation or amplification adjustment in the sonde either prior to or during a logging operation. First, for purposes of completeness a suitable power source 34 may be provided at the surface for delivering power to be utilized by the various circuits in the sonde 2 by means of an appropriate power transformer 33 having primary and secondary windings 35 and 36, respectively. The transformer secondary 36 will be conveniently connected to conductors of the logging cable 3 such as conductors 11 and 14 for purposes of delivering the power to the sonde 1. More particularly, these conductors 11 and 14 will preferably be connected to a second power transformer 30 having secondary and primary windings 32 and 31, respectively, whereby the power from power source 34 is delivered over conductor 27a to a power supply 27 (also depicted in FIG. 3). The power supply 27 may be adapted to supply the power requirements of the various circuits in the sonde 1 in accordance with well known and conventional techniques, and thus the details thereof are not described herein.

It will be recalled that, as hereinbefore stated, it would be desirable to provide means for adjusting the amplitude of the received acoustic signals of each sequence of firings of the acoustic tool (such as in the borehole compensated mode and the cement bond logging mode, for example, as previously described). Thus, still referring to FIG. 6, there will be seen an appropriate pulse circuit 42 for providing positive and negative pulses for adjusting said amplitude in a manner to be described. These pulses may be delivered to a gating switch 82 and thence to a suitable diode network 37 on outputs 83 and 84 comprised of diodes 40–43 arranged in a recognizably conventional manner. Control circuitry 8 may be further provided for regulating the switch 82 so as to control the number and polarity of pulses generated by pulse circuit 42 and delivered to the diode network 37 for purposes to be hereinafter described.

The control circuit 8, switch 82, pulse circuit 42 and diode network 37 may be conveniently located at the surface, with the diode network 37 interconnected to conductors such as 11 and 14 of the logging cable 3. In this manner, a desired number and polarity of amplitude controlling pulses may be delivered on the logging cable 3 to the sonde in response to appropriate operation of the control circuitry 8.

There will further be seen in FIG. 6 a centertap output 85 interconnected to the secondary 32 of the downhole power transformer 30 located in the sonde 1 for purposes of detecting or "picking off" these amplitude control pulses superimposed on the conductors 11–14 along with the power being supplied from the power source 34. These amplitude control pulses will then be delivered to a pair of diodes 42 and 43 which are in turn interconnected to their respective multi-position stepping relays 44 and 45.

With the arrangement thus depicted in FIG. 6, it will be seen that by transmitting, for example, positive amplitude control pulses downhole from the surface by means of control circuitry 8, switch 82, and pulse circuit 42, these pulses may be delivered to the stepping relay 44 but blocked from being delivered to stepping relay 45 by diode 43 in a manner so as to cause the stepping relay 44 to advance one position for each such pulse thus received. In like manner, by delivering negative pulses down the conductor pair 11–14, the stepping relay 45 may be caused to selectively register at a next position in response to each such pulse while the stepping relay 44 remains unaffected due to the blocking of the negative pulses by the diode 42. It should thus be apparent that if the stepping relays 44 and 45 are attached to some suitable attentuator means or variable gain amplifiers, a means has thus been provided for selectively adjusting in a discrete fashion the gain or attenuation of a preselected attenuator network or amplifier downhole in response to surface generated amplitude control pulses. More particularly, it will be noted that attentuation of a circuit associated with stepping relay 44 may be controlled by selecting positive control pulses whereas amplitude or attentuation of a circuit associated with stepping relay 45 may be controlled by selecting negative pulses. Still further, because the stepping relays 44 and 45 may be of the recirculating type wherein after a preselected number of steps they return to an initial position, and because these discrete steps may be associated with specific attenuator or gain values such as factors of two for example, the amount of gain or attenuation thus selected may be controlled by the number of amplitude control pulses transmitted to the sonde 1 in response to the control circuitry 8 at the surface.

Referring now to FIG. 7 means may be seen for employing the previously described amplitude gate signals of FIG. 5D and the amplitude control pulses on outputs 83 and 84 in a manner so as to achieve the objectives of the present invention in which two separate sequences of transmitter-receiver acoustic logging measurements, each having independently variable gains or attentuations may be achieved, and whereby such sequences as well as the amplitudes or attentuations may be controlled by the same transmitter and receiver logic commands of FIGS. 5A and 5B.

First, there will be seen two acoustic measurement signal receivers 46 and 51 corresponding to those previously described as receivers 2b and 2c. Referring to receiver 46 for the moment, an acoustic signature received therein may be delivered as receiver output 74 to an appropriate amplifier 47, the amplifier output 75 of which may thereafter be delivered through a switch 49 to an attentuator network 50. The amplifier output 75, after attenuation by attenuator network 50 is thereafter delivered as attentuator output 79 through a switch to an amplifler 57 (which may correspond to main amplifier 26 of FIG. 4), the output 71 of which may be delivered to the surface through the logging cable 3. From a comparison of FIG. 6 and 7, it will be noted that the attentuator network 50 may have a suitable attentuator control 80 connected to the stepping relay 44 for purposes just described, whereby amplitude control pulses from the control circuitry 8, switch 82 and pulse circuit 42 located at the surface may thus control the attenuation setting of the attenuator network 50.

Referring again to FIG. 7, a like arrangement of components just described with respect to receiver 46 may be provided for the receiver 51. Thus, the receiver output 73 of receiver 51 may be delivered to an amplifier 52 having an amplifier output 76 which is also delivered through switch 54 to the hereinbefore noted attentuator network 50.

Referring again to receiver 46, the receiver output 74 may also be delivered on line 77 through switch 48 to a second attentuator network 55, the attenuator output 56 of which may thence be delivered through the same switch as that receiving the attenuator output 79 to the amplifier 57 and thereafter, as output 71, to the surface of logging cable 3.

In like manner, with respect to receiver 51, the receiver output 73 may be delivered on line 78 through switch 53 to the second attenuator network 55 and thereafter as attenuator output 56 through a switch to the amplifier 57 and to the surface as just described. In like manner to the attenuator network 50, examination of FIG. 7 reveals that the second attenuator network 55 may preferably contain an attenuator control 81 responsive to gain control pulses from stepping relay 45 (which are in turn corresponding to the amplitude control pulses generated at the surface) in a manner so as to adjust the attenuation of the incoming signal (either receiver output 74 through switch 48 or receiver output 73 through switch 53) in response to the surface generated amplitude control pulses.

Still referring to FIG. 7 there will be seen two additional amplitude control signals 66 and 68. Control signal 68 will, in a manner to be described, control the opening and closing of switches 48, 49, 53, and 54, whereas control signal 66 will control the switch connected to the input of amplifier 57 whereby either attenuator output 79 or attenuator output 56 may alternatively be delivered to amplifier 57.

For purposes of illustration, it may be assumed that control signal 66 has caused the switch input to amplifier 57 to be located in the position illustrated in FIG. 7 whereby only signals delivered to the second attenuator 55 (which are attenuated thereby in an amount dependent upon the attenuator control 81 setting depicted in FIG. 7) are thereafter delivered by amplifier 57 to the surface. These two signals which may thus be delivered to the second attenuator signal 55 are receiver 46 output 74 through switch 48 and receiver 73 output through switch 53. It may further be assumed, that in response to control signal 68, switch 48 may be caused to close momentarily in response to an appropriate portion of receiver logic command of FIG. 5B thus delivering any acoustic energy incident upon receiver 46 to the attenuator 55. It may also be assumed that, in like manner, in response to control signal 68 generated in like response to another appropriate portion of receiver logic command of FIG. 5B, switch 48 may then be caused to open, and switch 53 to close momentarily so as to deliver any incident acoustic energy on receiver 51 to the attenuator 55, whereupon the switch 53 is then caused to open. In this manner, acoustic signatures received by receivers 46 and 51 may then be attenuated by the same amount by the attenuator 55 prior to amplification by amplifier 57 and delivery to the surface, as for example in the third and fourth firings depicted in FIG. 5C, namely $T_2R_1$, $T_2R_2$.

Similarily, control signal 66 may thereafter cause the switch input to amplifier 57 to shift to the upward position, whereby signals presented to the attenuator network 50 from receivers 46 or 51 will be attenuated by like amounts dependent upon attenuator control 80 setting prior to delivery to the amplifier 57 and ultimately to the surface through the logging cable 3. In response to the control signal 68 derived from the respective portions of receiver logic command signal of FIG. 5B, switch 49 may be caused to close temporarily so as to cause acoustic energy incident upon receiver 46 to be amplified by amplifier 47, attenuated by attenuator network 50, amplified by amplifier 57 and thence delivered to the surface. Finally, the control signal 68 may similarly cause switch 49 to open and switch 54 to close momentarily so as to permit passage of acoustic energy received by receiver 51 to amplifier 52, through switch 54, through the same attenuator network 50 and thence to the amplifier 57 for amplification and delivery to the surface.

In the manner thus described, it will be appreciated that means are thus provided whereby sequences of transmitter and receiver firings may be first attenuated at one fixed level dependent upon second attenuator 55 when the input switch to amplifier 57 is in the lower position, and further permitting attenuation of acoustic signals from another sequence amplified by amplifiers 47 or 52, wherein the attenuation of this next series of firings is dependent upon the setting of the attenuator network 50.

Assuming that signals of a relatively high magnitude are anticipated in the receivers 46 and 51 (such as is the case with respect to cement bond logging for example) these signals may therefore be caused to bypass amplification by amplifiers 47 and 52 and to be attenuated by attenuator 55 in response to attenuator control 81 in a manner sufficient to maintain the amplifier 57 in an unsaturated mode by causing the input switch to amplifier 57 to be in the lower position.

However, when substantially lower acoustic signals are anticipated in receivers 46 and 51 (such as in the case of conventional borehole compensated logging of formations), these relatively lower signals may thus, in the manner just described, be caused to be initially amplified by amplifiers 47 and 52, and thereafter to have the amplifier output 75 and 76 adjusted in accordance with the first attenuator network 50 (in response to the attenuator control 80) so as to cause the attenuator output 79 to be in a range which will prevent amplifier 57 from saturating. This latter operation, of course, is caused by the control signal 66 in turn causing the input switch to amplifier 57 to be located in the upward position thus causing the amplifier 57 to accept only signals from the attenuator network 50 and thus from amplifiers 47 and 52, corresponding to the second firing of the sequence $T_2R_1$, $T_2R_2$ depicted in FIG. 5C.

It will be appreciated that the respective settings of the attenuator networks 50 and 55 may thus be made prior to the logging operation or during the logging operation in response to the amplitude control pulses described in FIG. 6. More particularly, the respective attenuator networks may be set so as to be compatible with the expected dynamic range of acoustic signals received by receivers 46 and 51 in the conventional acoustic logging mode (with respect to network 50) and in cement bond logging or other similar applications (with respect to attenuator 55).

There may be seen in the upper portion of FIG. 7 appropriate transmitter and receiver logic buffers 60 and 61 each having their respective inputs 59 and 58. These buffers 60-61 may be recognized as portions of the logic circuitry 17 of FIG. 4 with the input 59 corresponding to transmitter logic command signals of FIG. 5A and the input 58 corresponding to receiver logic command signals of FIG. 5B. The output 69 of buffer 60 may be delivered to a suitable AND gate 63 and inverted and applied to a similar AND gate 64. Similarly the output 70 of buffer 61 may be delivered to the AND gate 64 and inverting input of AND gate 63. The output 67 of the AND gate 63 is then connected to an amplitude gating control 65 for purposes to be described and the output of the AND gate 64 also delivered to the gating control 65 for purposes to be described.

The amplitude gating control 65 having a control signal 66 output may be recognized as the means whereby the amplitude gate pulse of FIG. 5D may be generated in accordance with the truth table previously described so as to select one of two levels of attenuation depending on whether a conventional acoustic logging or cement bond logging operation is being performed, as previously described. Thus, it will be further noted that the buffers 60 and 61 may further provide indications to the gates 63 and 64 as to whether the transmitter logic command signal 59 and receiver logic command signal 58 are in periods of upward or lower transition, whereby the amplitude gating control 65 may implement the truth table hereinbefore set forth so as to generate control signal 66 corresponding to the amplitude gate signal depicted in FIG. 5D. Although the control signal 68 is depicted in FIG. 7 as originating in the buffer 61, it will be appreciated that additional circuitry of logic circuitry 17 may be provided for generating this control signal 68 in response to the logic commands of FIG. 5A and 5B so as to control the switches 48-49 and 53-54 in the manner just described.

Many other variations and modifications may be made, in the methods and apparatus hereinbefore described, without departing from the concept of the present invention. Accordingly, it should be clearly understood that the methods and apparatus depicted in the accompanying drawings and referred to in the foregoing description, are illustrative only, and are not intended as limitations on the scope of the invention.

I claim:

1. A method of investigating subsurface areas traversed by a borehole with a logging sonde comprising the steps of:
    disposing said logging sonde within said borehole;
    generating transmitter and receiver logic command signals, said command signals controlling said sonde between two acoustic logging measurement modes;
    delivering said transmitter and receiver logic command signals to said sonde;
    generating transmitter acoustic signals and receiver signals in response to said logic command signals;
    generating an amplitude control signal in response to the relative states of said logic command signals; and
    adjusting the amplitude of said received acoustic signal in response to said amplitude control signal and in accordance with said acoustic logging measurement modes.

2. The method of claim 1, wherein said sonde comprises:
    a first and second transmitter, and a first and second receiver, wherein said transmitter logic command signal is a pulse train having
        a first state corresponding to activation of said first transmitter; and
        a second state corresponding to activation of said second transmitter;
    wherein said receiver logic command signal is a pulse train having
        a first state corresponding to activation of said first receiver; and
        a second state corresponding to activation of said second receiver.

3. The method of claim 2, wherein said step of generating said amplitude control signal includes comparing relative states of said first and said second states of said receiver logic command signal with states of said first and second states of said transmitter logic command signal.

4. The method of claim 3, wherein said amplitude control signal has a first and second state and changes states when one of said transmitter of receiver logic commands is in a respective one of said first and second states and the other of said transmitter or receiver logic commands is in a transition from one of said first and second states to the remaining one of said first and second states.

5. The method of claim 4, wherein said amplitude of said acoustic signal is adjusted by said amplitude control signal to be within a first discrete range when said amplitude control signal is in said first state and to be within a second discrete range when said amplitude control signal is in said second state.

6. Apparatus disposed within a logging sonde for investigating subsurface areas transversed by a borehole in response to surface generated transmitter and receiver logic commands, comprising: transmitter means for generating acoustic energy in response to said transmitter logic command;

transmitter logic command means for detecting said transmitter logic and controlling said transmitter means in response thereto between two transmitter sequences;

receiver means for detecting said generated acoustic energy in response to said receiver logic command;

receiver logic command means for detecting said logic command and controlling said receiver means in response thereto between two receiver sequences;

variable attenuator means for adjusting the amplitude level of said detected acoustic energy; and logic command means interconnected from said transmitter and receiver logic command means to said attenuator means for monitoring said transmitter and receiver logic commands and generating in response to the relative states of said logic commands an amplitude control signal for controlling said amplitude level of said detected acoustic energy in response to said amplitude control signal and in accordance with said two transmitter and receiver sequences.

7. Apparatus of claim 6, wherein
said transmitter means comprises a first and second transmitter;

said receiver means comprises a first and second receiver;

said transmitter logic command is a pulse train having first and second states corresponding to activation of said first and second transmitters, respectively;

said receiver logic command is a pulse train having first and second states corresponding to activation of said first and second receiver means, respectively; and said logic command means includes comparator means for comparing relative states of said first and second states of said receiver logic command with states of said first and second states of said transmitter logic command.

8. Apparatus of claim 7, wherein:
said comparator means includes
means for detecting when one of said transmitter or receiver logic commands is in a respective one of said first and second states and the other of said transmitter or receiver logic commands is in a transition from one of said first and second states to the remaining one of said first and second states; and wherein said logic command means further includes means for generating said amplitude control signal having a first state when said comparator means detects when said one of said transmitter or receiver logic commands is in said respective one of said first and second states and the other of said transmitter or receiver logic commands is in said transition from one of said first and second states to the remaining one of said first and second states; and further having a second state when neither of said transmitter or receiver logic command signals is in a transition between said respective first and second states.

9. Apparatus of claim 8, wherein said variable attenuator means is responsive to said amplitude control signal.

10. Apparatus of claim 9, wherein said variable attenuator means adjusts said amplitude level of said detected acoustic energy to a first amplitude range in response to said first state of said amplitude control signal generator means and to a second range in response to said second state of said amplitude control signal generator means.

* * * * *